United States Patent
Park et al.

(10) Patent No.: US 9,143,791 B2
(45) Date of Patent: Sep. 22, 2015

(54) METHOD AND APPARATUS FOR PROCESSING VIDEO FRAME BY USING DIFFERENCE BETWEEN PIXEL VALUES

(75) Inventors: Sung-bum Park, Seongnam-si (KR); Jae-won Yoon, Seoul (KR); Hae-young Jun, Seoul (KR); Shin-wook Kang, Hwaseong-si (KR); Dai-woong Choi, Seoul (KR); Huai-rong Shao, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 554 days.

(21) Appl. No.: 13/103,578

(22) Filed: May 9, 2011

(65) Prior Publication Data

US 2011/0274177 A1 Nov. 10, 2011

Related U.S. Application Data

(60) Provisional application No. 61/361,043, filed on Jul. 2, 2010, provisional application No. 61/333,016, filed on May 10, 2010.

(30) Foreign Application Priority Data

Oct. 26, 2010 (KR) .................. 10-2010-0104751

(51) Int. Cl.
*H04N 19/182* (2014.01)
*H04N 19/105* (2014.01)
*H04N 19/176* (2014.01)
*H04N 19/593* (2014.01)
(Continued)

(52) U.S. Cl.
CPC ........... *H04N 19/182* (2014.11); *H04N 19/105* (2014.11); *H04N 19/124* (2014.11); *H04N 19/176* (2014.11); *H04N 19/593* (2014.11); *H04N 19/91* (2014.11)

(58) Field of Classification Search
USPC ..................................... 375/240.12, 240.24
See application file for complete search history.

(56) References Cited

U.S. PATENT DOCUMENTS

| | | | |
|---|---|---|---|
| 6,072,909 A | 6/2000 | Yokose et al. | |
| 6,173,078 B1 * | 1/2001 | Kadono | ........................ 382/238 |

(Continued)

FOREIGN PATENT DOCUMENTS

| | | |
|---|---|---|
| CN | 1377190 A | 10/2002 |
| CN | 101411196 A | 4/2009 |

(Continued)

OTHER PUBLICATIONS

International Search Report (PCT/ISA/210), issued by the International Searching Authority in corresponding International Application No. PCT/KR2011/003435 on Jan. 16, 2012.

(Continued)

*Primary Examiner* — Dave Czekaj
*Assistant Examiner* — Shanika Brumfield
(74) *Attorney, Agent, or Firm* — Sughrue Mion, PLLC (57) ABSTRACT

A method and apparatus for processing a video frame is provided. The method includes dividing the video frame into pixel blocks each including a reference pixel; calculating difference values between the reference pixel and pixels neighboring the reference pixel; converting the calculated difference values into values that belong to a bit depth range; and performing entropy coding by using the converted difference values as symbols.

24 Claims, 9 Drawing Sheets

(51) Int. Cl.
*H04N 19/124* (2014.01)
*H04N 19/91* (2014.01)

(56) References Cited

U.S. PATENT DOCUMENTS

| | | | |
|---|---|---|---|
| 6,654,419 B1 * | 11/2003 | Sriram et al. | 375/240.12 |
| 2002/0006229 A1 | 1/2002 | Chao et al. | |
| 2007/0065023 A1 | 3/2007 | Lee et al. | |
| 2007/0195888 A1 * | 8/2007 | Sabeti | 375/240.24 |
| 2007/0223579 A1 * | 9/2007 | Bao | 375/240.12 |
| 2010/0092097 A1 | 4/2010 | Fukuhara et al. | |

FOREIGN PATENT DOCUMENTS

| | | | | |
|---|---|---|---|---|
| EP | 838955 A2 * | 4/1998 | | H04N 7/50 |
| EP | 2059048 A2 * | 5/2009 | | |
| EP | 2129135 A1 * | 12/2009 | | H04N 7/34 |
| WO | WO 9901979 A2 * | 1/1999 | | |

OTHER PUBLICATIONS

Communication dated Jun. 30, 2015 issued by the Chinese Patent Office in counterpart Chinese Patent Application 201180034171.0.

* cited by examiner

| Symbol | codeword |
|---|---|
| 0 | 1 |
| 1 | 010 |
| 2 | 011 |
| 3 | 00100 |
| 4 | 00101 |
| 5 | 00110 |
| 6 | 00111 |
| 7 | 0001000 |
| 8 | 0001001 |
| ... | ... |

| Original dif. | Unsigned diff. | Mapped diff.(=symbol) | code word |
|---|---|---|---|
| −255 | 1 | 2 | 011 |
| −254 | 2 | 4 | 00101 |
| ⋮ | ⋮ | ⋮ | ⋮ |
| −2 | 254 | 3 | 00100 |
| −1 | 255 | 1 | 010 |
| 0 | 0 | 0 | 1 |
| 1 | 1 | 2 | 011 |
| 2 | 2 | 4 | 00101 |
| ⋮ | ⋮ | ⋮ | ⋮ |
| 254 | 254 | 3 | 00100 |
| 255 | 255 | 1 | 010 |

| EncodeDiffValue(PixelPosition, NumPixelPartition, BitDepth) { |
|---|
| for (i=0;i<NumPixelPartition;i++) { |
| Diff=(DiffBuff[PixelPosition] [i]+(1<<BitDepth))%(1<<BitDepth) |
| if (Diff>=(1<<(BitDepth−1))) |
| Diff=Diff−(1<<BitDepth) |
| if (Diff>=0) |
| MapDiff=Diff<<1 |
| else |
| MapDiff=(−1×Diff)<<1−1 |
| } |
| } |

1110 covers rows 2–3; 1120 covers rows 4–9.

```
DecodeDiffValue(PixelPosition, NumPixelPartition, BitDepth) {
  for (i=0;i<NumPixelPartition;i++) {
    MapDiff
    if (MapDiff%2==0)
      Diff=MapDiff>>1
    else
      Diff=(1<<BitDepth)-((MapDiff+1)>>1)
    ImgBuff[PixelPosition][i]=(Diff+PrevPix)%(1<<BitDepth)
    MapDiff=(-1×Diff)<<1-1
  }
}
```

1310 brackets the if/else block. 1320 points to the ImgBuff line.

FIG. 14

METHOD AND APPARATUS FOR PROCESSING VIDEO FRAME BY USING DIFFERENCE BETWEEN PIXEL VALUES

CROSS-REFERENCE TO RELATED PATENT APPLICATION

This application claims the benefit of U.S. Provisional Patent Application Nos. 61/333,016 and 61/361,043 filed on May 10 and Jul. 2, 2010, respectively, in the U.S. Patent and Trademark Office, and priority from Korean Patent Application No. 10-2010-0104751, filed on Oct. 26, 2010, in the Korean Intellectual Property Office. The disclosures of all three applications are incorporated by reference herein in their entirety.

BACKGROUND

1. Field

Methods and apparatuses consistent with the present disclosure relate to a method and apparatus for encoding and decoding a video frame.

2. Description of the Related Art

As image processing and communication technologies have developed, a size of image data transmitted and received through a network has been gradually increasing. Recently, technology for reproducing full high definition (full-HD) video having a resolution of 1920×1080 by seamless streaming has been spotlighted. A seamless reproduction of mass storage and high quality image data needs a wide bandwidth, and thus research into communication technology for using a 60 GHz band has been actively conducted. A radio wave in the 60 GHz band has directionality, and thus an available bandwidth in 60 GHz communications is influenced by obstacles present in a path of a beam. In this environment, it is necessary to efficiently compress raw image data in order to secure a quality of service. To this end, an Advanced Video coding (AVC)/H.264 codec is used. However, most codecs used for image processing require many operations, which is complicated and uses up many system resources.

A device having a limited power capacity and operation resources, such as a mobile device, requires image processing technology that is relatively easily implemented and requires a small amount of operations compared to conventional codecs, in order to process mass storage and high quality image data.

SUMMARY

One or more exemplary embodiments provide a method and apparatus for efficiently encoding and decoding image data.

According to an aspect of an exemplary embodiment, there is provided a method of encoding a video frame, the method including dividing the video frame into a plurality of pixel blocks each including a reference pixel; calculating difference values between the reference pixel and pixels neighboring the reference pixel; converting the calculated difference values into values that belong to a bit depth range; and performing entropy coding by using the converted difference values as symbols.

The difference values between the reference pixel and the pixels neighboring the reference pixel may be calculated for each one of the pixel blocks, and the calculated difference values may be converted with respect to the pixel blocks into values that belong to a bit depth range.

The converting of the calculated difference values may include summing the difference values and a level value of a bit depth; and performing a modulo operation on the summed values by using the level value of the bit depth.

The performing of entropy coding may include mapping the converted difference values to symbols used for entropy coding using an exponential Golomb code in an order of occurrence probabilities of the difference values before being converted.

The mapping of the converted difference values may be performed according to $$S_d = \begin{cases} 0 & (d = 0) \\ 2d & (1 \leq d \leq 2^{P-1} - 1) \\ 2(2^P - d) - 1 & (2^{P-1} \leq d \leq 2^P - 1) \end{cases}$$

wherein d denotes the converted difference values, $S_d$ denotes the symbols mapped to d, and p denotes the bit depth.

According to another aspect of an exemplary embodiment, there is provided a computer-readable recording medium storing a computer-readable program for executing the method of encoding a video frame.

According to another aspect of an exemplary embodiment, there is provided a apparatus for encoding a video frame, the apparatus including a frame dividing unit that divides the video frame into a plurality of pixel blocks each including a reference pixel; a difference value calculating unit that calculates difference values between the reference pixel and pixels neighboring the reference pixel; a difference value converting unit that converts the calculated difference values into values that belong to a bit depth range; and an entropy coding unit that performs entropy coding by using the converted difference values as symbols.

The difference value calculating unit may calculate, for each one of the pixel blocks, the difference values between the reference pixel and the pixels neighboring the reference pixel, and the difference value converting unit may convert the calculated difference values with respect to the pixel blocks into values that belong to a bit depth range.

The difference value converting unit may include a summing unit that sums the difference values with a level value of a bit depth; and a modulo operation performing unit that performs a modulo operation on the summed values by using the level value of the bit depth.

The entropy coding unit may map the converted difference values to symbols used for entropy coding using an exponential Golomb code in an order of occurrence probabilities of the difference values before being converted.

The entropy coding unit may map the converted difference values according to $$S_d = \begin{cases} 0 & (d = 0) \\ 2d & (1 \leq d \leq 2^{P-1} - 1) \\ 2(2^P - d) - 1 & (2^{P-1} \leq d \leq 2^P - 1) \end{cases}$$

wherein d denotes the converted difference value, $S_d$ denotes the symbols mapped to d, and p denotes the bit depth.

According to another aspect of an exemplary embodiment, there is provided a method of decoding an encoded video frame, the method including reconstructing symbols used for entropy coding from encoded pixel values; mapping the reconstructed symbols to values that belong to a bit depth range; summing the mapped values and a pixel value of a reference value; performing a modulo operation on the summed values by using a level value of a bit depth; and determining resultant modulo operation values as pixel values of pixels neighboring a reference pixel in pixel blocks included in the encoded video frame.

The mapping of the reconstructed symbols may be performed according to $$D_s = \begin{cases} 0 & (s=0) \\ s/2 & (s:\text{even}) \\ 2^P - (s+1)/2 & (s:\text{odd}) \end{cases}$$

wherein $D_s$ denotes the mapped values for the symbols s, and p denotes the bit depth.

The symbols may be entropy coding symbols corresponding to an exponential Golomb code.

According to another aspect of an exemplary embodiment, there is provided a computer-readable recording medium storing a computer-readable program for executing the method of decoding an encoded video frame.

According to another aspect of an exemplary embodiment, there is provided a apparatus for decoding an encoded video frame, the apparatus including a symbol reconstruction unit that reconstructs symbols used for entropy coding from encoded pixel values; a mapping unit that maps the reconstructed symbols to values that belong to a bit depth range; a summing unit that sums the mapped values with a pixel value of a reference value; a modulo operation performing unit that performs a modulo operation on the summed values by using a level value of a bit depth; and a pixel value determining unit that determines resultant modulo operation values as pixel values of pixels neighboring a reference pixel in pixel blocks included in the encoded video frame.

The mapping unit may map the reconstructed symbols according to $$D_s = \begin{cases} 0 & (s=0) \\ s/2 & (s:\text{even}) \\ 2^P - (s+1)/2 & (s:\text{odd}) \end{cases}$$

wherein $D_s$ denotes the mapped values for the symbols s, and p denotes the bit depth.

The symbols may be entropy coding symbols corresponding to an exponential Golomb code.

BRIEF DESCRIPTION OF THE DRAWINGS

The above and other aspects will become more apparent by describing in detail exemplary embodiments thereof with reference to the attached drawings in which.

DETAILED DESCRIPTION

The present inventive concept will now be described more fully with reference to the accompanying drawings, in which exemplary embodiments are shown.

Figure 1:
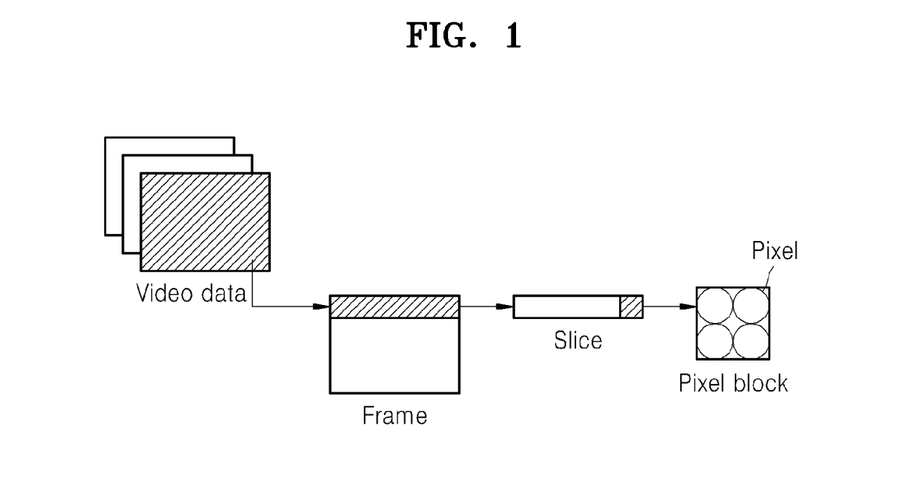
FIG. 1 is a conceptual diagram for explaining a process of dividing a video frame into pixel blocks according to an exemplary embodiment.

FIG. 1 is a conceptual diagram for explaining a process of dividing a video frame into pixel blocks according to an exemplary embodiment.

Referring to FIG. 1, video data includes a plurality of video frames. Each video frame is divided into a plurality of slices. For example, one video frame of 1920×1080 may be divided into 135 slices having a resolution of 1920×8. Each slice may be divided into a plurality of pixel blocks. For example, one slice of 1920×8 may be divided into pixel blocks of 8×8. Pixel blocks of 2×2 are shown in FIG. 1 as a simplified example.

Figure 2:
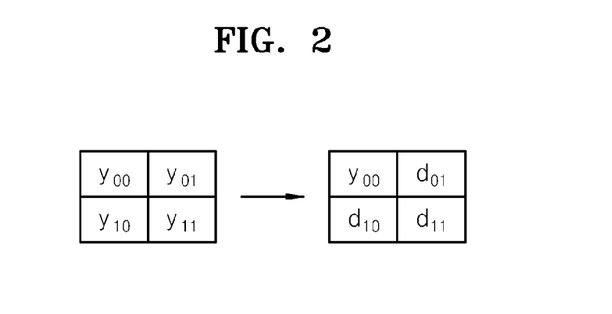
FIG. 2 is a conceptual diagram for explaining a process of converting (encoding) a pixel block according to an exemplary embodiment.

FIG. 2 is a conceptual diagram for explaining a process of converting (encoding) a pixel block according to an exemplary embodiment.

The pixel block determined according to the process described with reference to FIG. 1 is encoded by using a pixel value difference between pixels. Referring to FIG. 2, one of four pixels y00, y01, y010, and y11 in a 2×2 pixel block is determined as a reference pixel. The reference pixel is not converted but the other pixels are converted into difference values between pixels. A video frame has a spatial correlation between neighboring pixels. Thus if pixels are encoded by using difference values between neighboring pixels, a redundancy is removed, thereby increasing encoding efficiency. For example, the pixel y00 is determined as the reference pixel in FIG. 2. Difference values of the other pixels y01, y010, and y11 are determined as shown below.

$$d01 = y01 - y00 \quad (1)$$

$$d10 = y10 - y00 \quad (2)$$

$$d11 = y11 - y10 \quad (3)$$

More specifically, the pixels y00, y01, y010, and y11 included in one pixel block are converted into pixel values y00, d01, d10, and d11, respectively (no change in the reference pixel y00). In this regard, the pixel value d11 is calculated by using a pixel value of the pixel y10 rather than the reference pixel y00 due to a high correlation between the pixels y11 and y10 since the pixel y11 is closer to the pixel y10 than the reference pixel y00.

Although the pixel y11 is converted into the difference value between the pixels y10 and y11 in the present exemplary embodiment, the pixel y11 may alternatively be converted into a difference value between the pixels y01 and y11.

Therefore, the converted pixel values may be restored using the following processes:

$$y01=s01-y00 \quad (4)$$

$$y10=s10-y00 \quad (5)$$

$$y11=s11-y10 \quad (6)$$

In this regard, since the pixel y10 is necessary for restoring the pixel y11, process (5) is performed before process (6).

Figure 3:
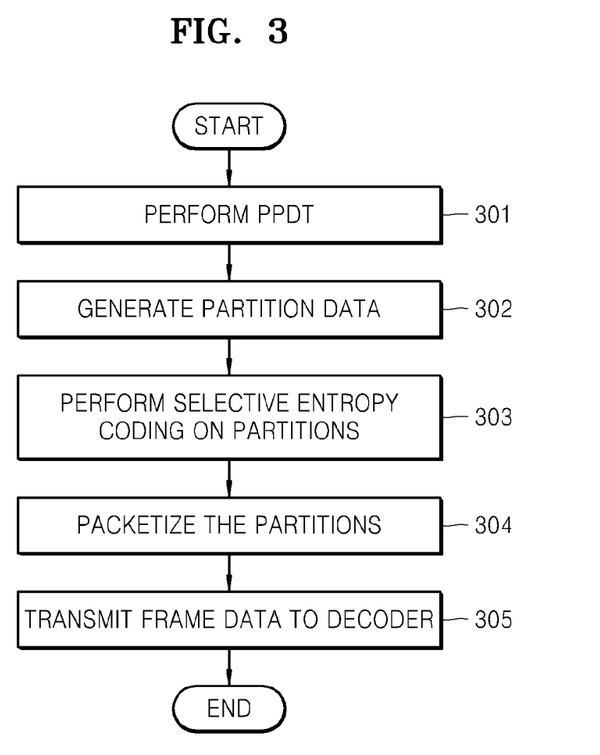
FIG. 3 is a flowchart of a process of processing image data at a transmission end according to an exemplary embodiment.

FIG. 3 is a flowchart of a process of processing image data at a transmission end according to an exemplary embodiment.

Referring to FIG. 3, in operation 301, pixel predictive differential transformation (PPDT) is performed on a video frame. In this regard, the PPDT indicates the process described with reference to FIG. 2. More specifically, the PPDT is a process of encoding pixels by using pixel value differences, and converts pixel values of all pixels included in one video frame into n reference pixel values (where n is the number of pixel blocks) and a plurality of difference values for each of the n reference pixel values, as described with reference to FIG. 2.

In operation 302, partition data is generated. In this regard, a partition is a set of values of pixels converted as a result of the PPDT at a specific position in pixel blocks belonging to one slice. For example, if a slice is divided into 2×2 pixel blocks as shown in FIG. 2, pixels at the position y00 of pixel bocks included in the slice may be configured as a partition.

In this way, partitions include pixels at the same positions of pixel blocks in order to perform selective entropy coding according to partitions. The entropy coding is performed selectively on partitions in operation 303. Selective entropy coding according to partitions may minimize an influence of a bit error due to a channel problem. For example, if the bit error occurs at d10 of FIG. 2, y10 and y11 cannot be reconstructed. However, if the bit error occurs at the position d11 of FIG. 2, y10 can be reconstructed, and thus d10 is relatively more important than d11. Therefore, entropy coding is not performed on a partition including pixels at the position d10 according to a channel status, thereby reducing an influence of the bit error.

Furthermore, an overflow may occur at a specific partition during entropy coding according to the characteristics of the video frame. Thus, in this case, entropy coding is not performed on the partition, thereby preventing the overflow from occurring.

In operation 304, the partitions are packetized. That is, a header is added to the partition data, and a packet is generated for each partition.

In operation 305, video frame data including the partition packets is transmitted to a decoder over a network.

Figure 4:
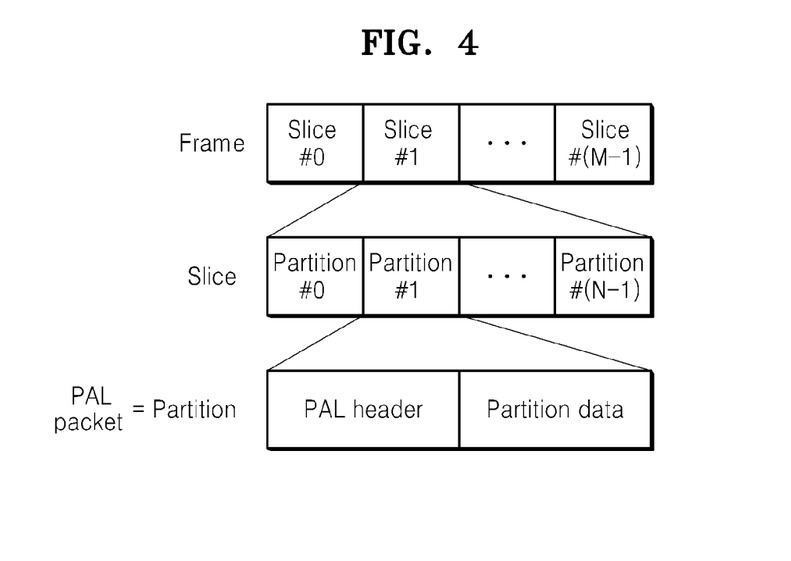
FIG. 4 shows a format of image data output at a transmission end according to an exemplary embodiment.

FIG. 4 illustrates a format of image data output at a transmission end according to an exemplary embodiment. Referring to FIG. 4, a frame includes a plurality of slices, and each slice includes a plurality of partitions.

A header of a partition packet (PAL header) may include a video frame number, a slice number, information indicating whether entropy coding is performed, information regarding a size of a pixel block, pixel position information indicating a position of a pixel included in a partition in a pixel block, and the like.

Figure 5:
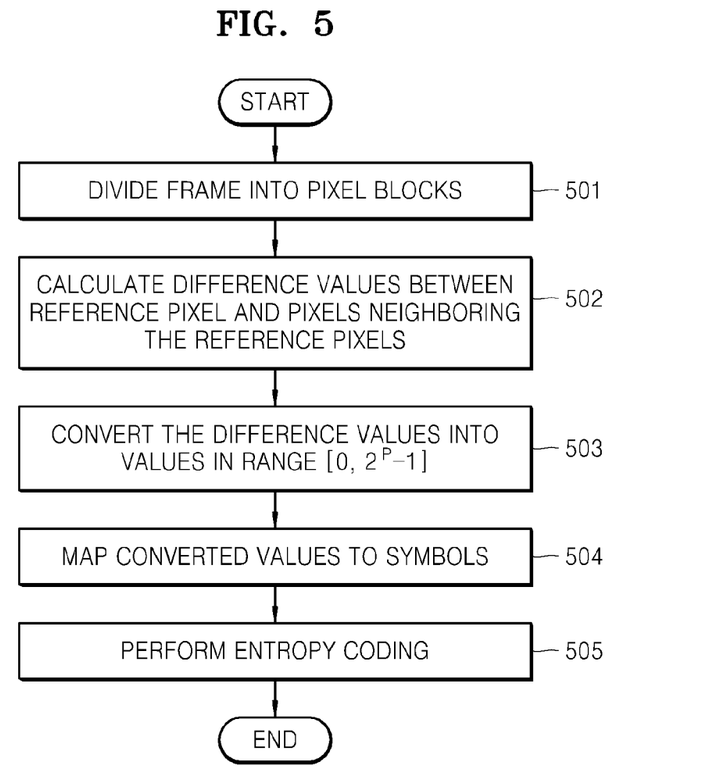
FIG. 5 is a flowchart of a process of encoding a video frame according to an exemplary embodiment.

FIG. 5 is a flowchart of a process of encoding a video frame according to an exemplary embodiment.

Referring to FIG. 5, in operation 501, the video frame is divided into a plurality of pixel blocks.

In operation 502, difference values between a reference pixel and neighboring pixels of the reference pixel in the pixel blocks are calculated. As described with reference to FIG. 2, the pixel y11 is converted into a difference value between the pixels y10 and y11 rather than the reference pixel.

More specifically, in operations 501 and 502, a PPDT is performed on the pixels of the video frame. Values converted through the PPDT are converted into values suitable for efficient entropy coding. Such a process is performed in operations 503 and 504.

In operation 503, the difference values are converted into values in a range $[0, 2^p-1]$. In this regard, p denotes a bit depth of the video frame. Operation 503 enables the number of symbols used for entropy coding to be reduced.

For example, when the bit depth of the video frame is 8 bits, a pixel value has a range [0, 255], and the difference values have a range [−255, +255]. Thus, 9 bits are needed to present entropy coding symbols, and 511 code words are also needed. However, the difference values are converted into values belonging to the range $[0, 2^p-1]$ in operation 503, and thus entropy coding symbols may be represented using 8 bits, thereby reducing operations necessary for entropy coding and reducing implementation complexity. A conversion method will be described in more detail with reference to FIG. 6.

In operation 504, the converted values are mapped to respective entropy coding symbols. In this regard, the converted values are not mapped to entropy coding symbols in an order of sizes thereof but are rearranged to increase efficiency of entropy coding.

Entropy coding is an encoding method of differentiating lengths of codes indicating symbols according to probabilities of symbol occurrence. The higher the probability that the symbol occurs, the smaller the code used. However, the values converted in operation 503 are not arranged according to probabilities of occurrence of original difference values. Thus, the converted values are mapped to respective entropy coding symbols after being rearranged in an order of probabilities of occurrence of original difference values. Symbol mapping will be described in more detail with reference to FIGS. 8A through 8C.

In operation 505, entropy coding is performed.

Figure 6:
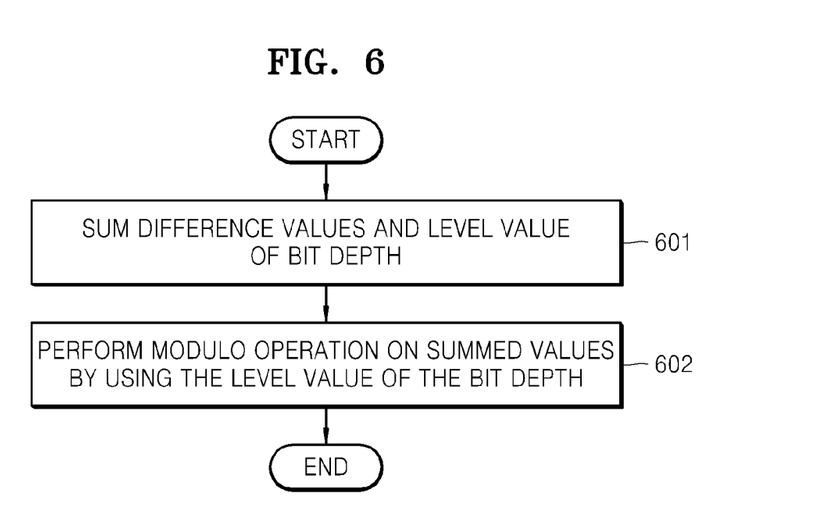
FIG. 6 is a flowchart of a process of converting difference values according to an exemplary embodiment.

FIG. 6 is a flowchart of a process of converting difference values according to an exemplary embodiment.

Referring to FIG. 6, in operation 601, a level value of a bit depth is summed with the difference values. In this regard, the level value of the bit depth refers to a size of a number that can be expressed by the bit depth. For example, if the bit depth is 8 bits, a level value of the bit depth is 256.

In operation 602, a modulo operation is performed on the summed value by using the level value of the bit depth. For example, when the difference value is −200, if the level value of the bit depth is 256, in operation 601, the summed value is 56. If the modulo operation is performed on the summed value 56 by using the level value of the bit depth of 256 (i.e. 56 mod 256), the modulo operation value is 56. That is, the original difference value −200 is converted into 56.

Figure 7:
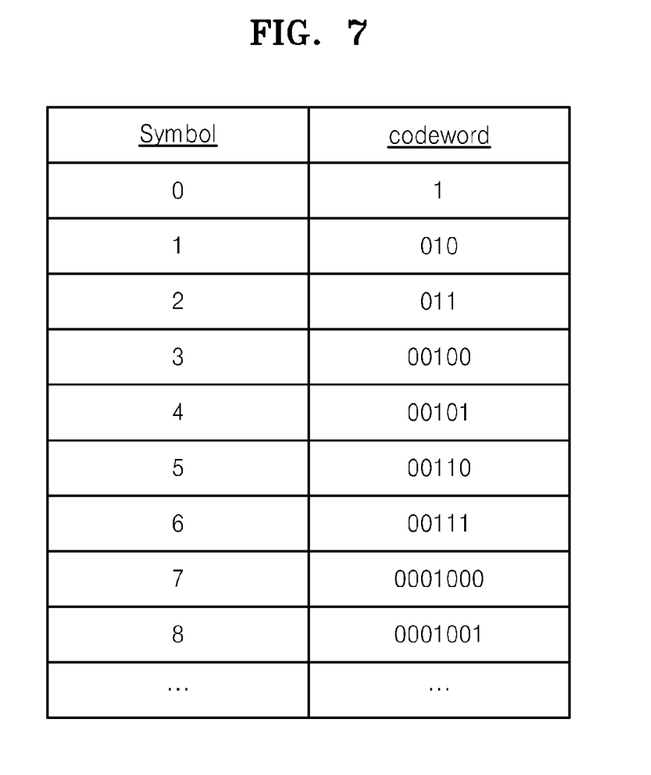
FIG. 7 is a code table used for entropy coding according to an exemplary embodiment.

FIG. 7 is a code table used for entropy coding according to an exemplary embodiment. In the present exemplary embodiment, an exponential Golomb code is used. However, another code may be used according to another implementation of the present exemplary embodiment.

Figure 8A:
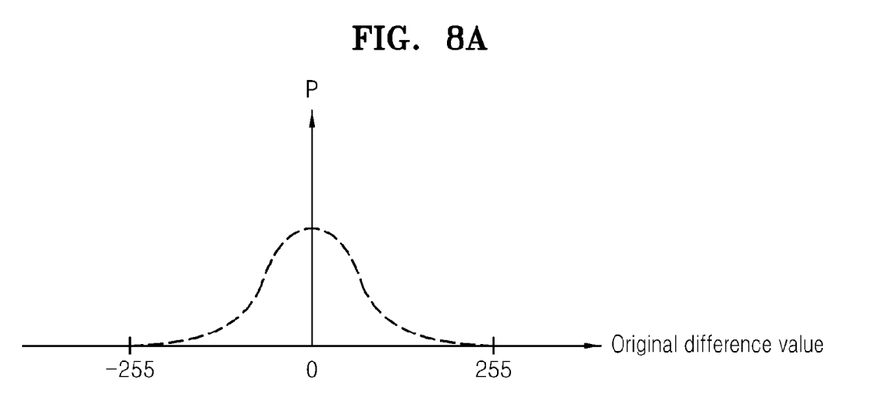
FIGS. 8A through 8C are graphs for describing variations of occurrence probabilities of difference values according to an exemplary embodiment.
Figure 8B:
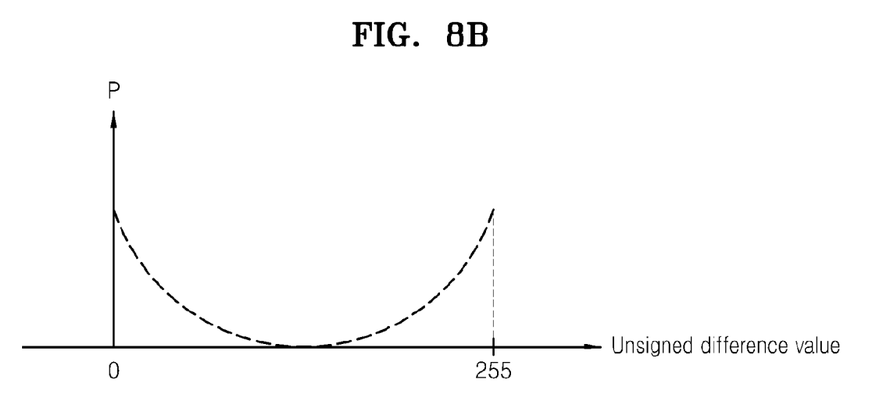
Figure 8C:
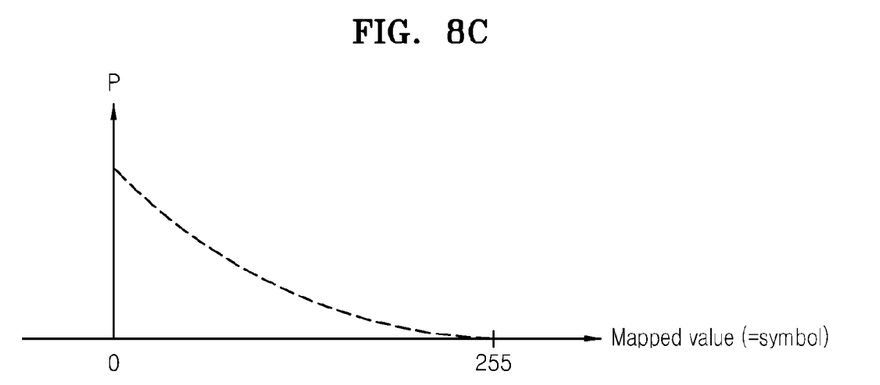

FIGS. 8A through 8C are graphs for describing variations of occurrence probabilities of difference values according to an exemplary embodiment.

As described above, although all difference values are converted into values in the range [0, $2^p-1$] by performing the process of FIG. 6, resultant values cannot be mapped to the symbols of FIG. 7 since the converted values are not arranged in the order of high occurrence probabilities of the difference values.

The graph of FIG. 8A shows a general probability distribution of the difference values when a bit depth is 8. That is, the occurrence probability is the highest when that the difference value is 0, and the farther away from the difference value 0, the lower the occurrence probability.

The graph of FIG. 8B shows an occurrence probability distribution of the values converted as a result of performing the process of FIG. 6. An original difference value −1 has a very high occurrence probability according to the graph of FIG. 8A. The original difference value −1 is converted into 255 as a result of performing the process of FIG. 6, and thus 255 has a very high occurrence probability in FIG. 8B, unlike in FIG. 8A. In this way, if all difference values are converted, negative values of FIG. 8A are converted into positive values in FIG. 8B, and thus the graph of FIG. 8A is converted into the graph of FIG. 8B.

To use the exponential Golomb code shown in FIG. 7, a symbol starts at 0, and the greater the symbol value, the lower the occurrence probability. The greater the symbol value, the longer the length of the code, and thus entropy coding has maximum efficiency. However, since the values converted as a result of performing the process of FIG. 6 have a probability distribution in a U or V shape as shown in FIG. 8B, if the converted values are mapped to the table of FIG. 7, entropy coding has low efficiency.

Therefore, the converted values are mapped to symbols so that the symbols have a probability distribution as shown in FIG. 8C. That is, the converted values are rearranged in an order of high occurrence probabilities of original difference values, and then the rearranged values are sequentially mapped to the symbols. For example, the converted values of 0, 255, 1, 254, 2, ... may be sequentially mapped to the symbols 0, 1, 2, 3, 4, ....

This process is summarized by the following equation:

$$S_d = \begin{cases} 0 & (d = 0) \\ 2d & (1 \le d \le 2^{P-1} - 1) \\ 2(2^P - d) - 1 & (2^{P-1} \le d \le 2^P - 1) \end{cases}$$

wherein, $S_d$ denotes a symbol to be mapped to a converted value d, and p denotes a bit depth.

Figure 9:
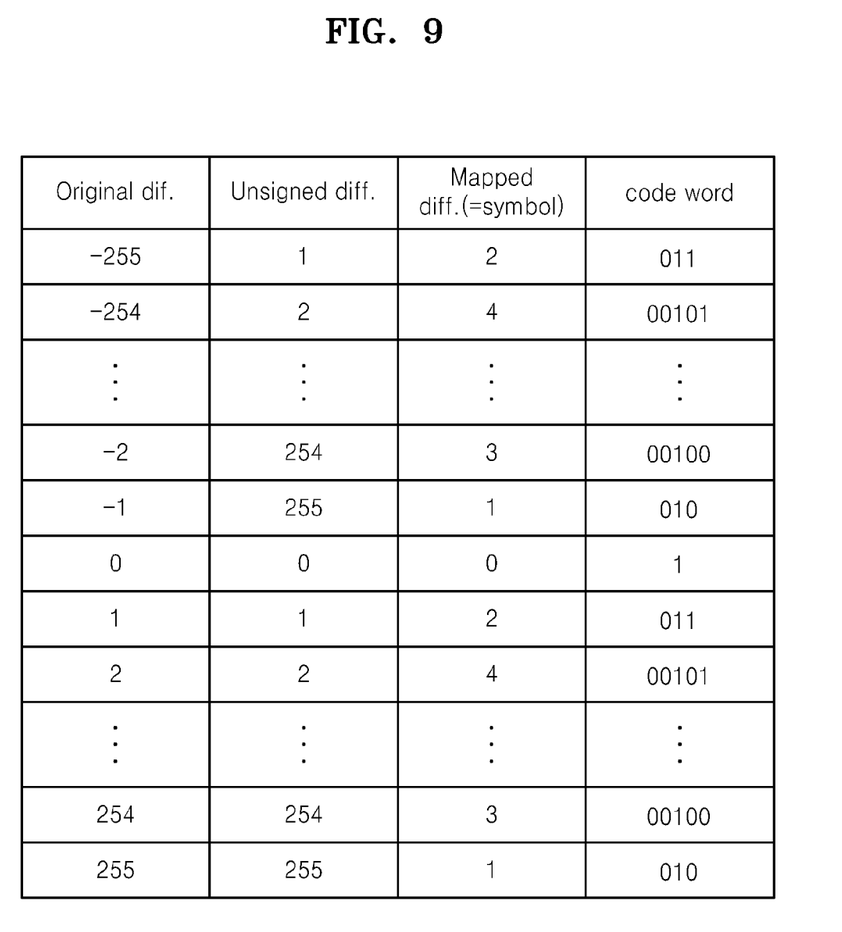
FIG. 9 is a table illustrating a result obtained by processing difference values according to an exemplary embodiment.

FIG. 9 is a table illustrating a result obtained by processing difference values according to an exemplary embodiment.

In the present exemplary embodiment, a bit depth is 8, and accordingly the difference values have a range [−255, 255]. For example, the original difference value −255 is converted into 1 by performing the process of FIG. 6, and then is mapped to an entropy coding symbol of 2. That is, a pixel corresponding to the original difference value −255 is finally encoded as 1.

Figure 10:
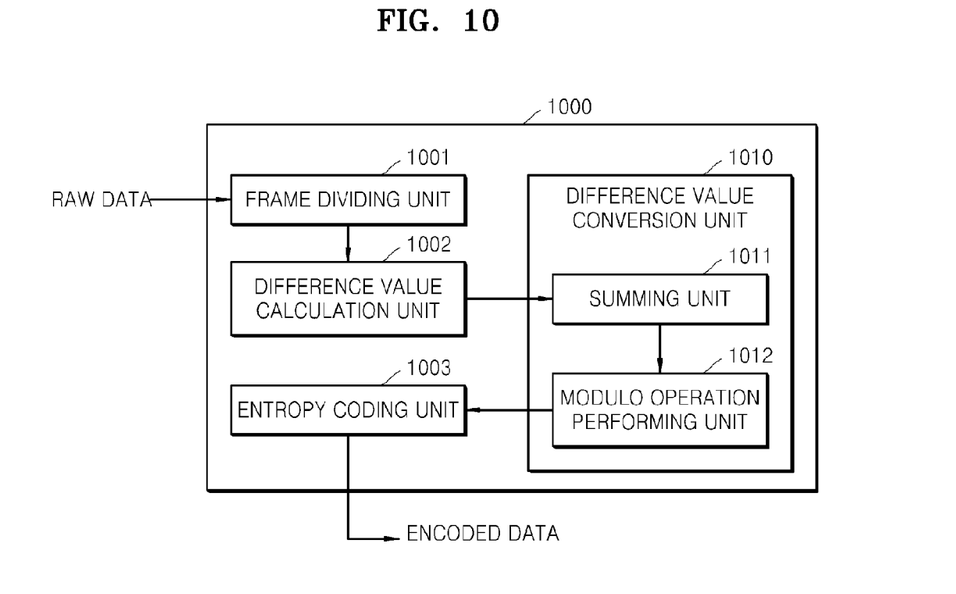
FIG. 10 is a block diagram of an apparatus for encoding a video frame according to an exemplary embodiment.

FIG. 10 is a block diagram of an apparatus 1000 for encoding a video frame according to an exemplary embodiment.

Referring to FIG. 10, the apparatus 1000 for encoding the video frame includes a frame dividing unit 1001, a difference value calculation unit 1002, an entropy coding unit 1003, and a difference value conversion unit 1010.

The frame dividing unit 1001 receives video frame data and divides the received video frame data into a plurality of pixel blocks.

The difference value calculation unit 1002 calculates, for each of the pixel blocks, difference values between pixels neighboring a reference pixel and the reference pixel.

The difference value conversion unit 1010 converts the difference values into values that belong to a bit depth range [0, $2^p-1$]. For example, if a bit depth is 8, the difference values are converted to have the bit depth range [0, 255]. Referring to FIG. 10, the difference value conversion unit 1010 includes a summing unit 1011 and a modulo operation performing unit 1012.

The summing unit 1011 sums the difference values obtained by the difference value calculation unit 1002 with level values of the bit depth. The modulo operation performing unit 1012 performs a modulo operation on resultant values obtained by the summing unit 1011 by using the level values of the bit depth. More specifically, original difference values, i.e. difference values input into the difference value calculation unit 1002, are converted into the resultant values obtained by the modulo operation performing unit 1012.

The entropy coding unit 1003 rearranges the resultant values obtained by the modulo operation performing unit 1012 in an order of high occurrence probabilities with respect to the original difference values, i.e., values that are not converted by the difference value conversion unit 1010, and maps the rearranged resultant values to entropy coding symbols. In this regard, the entropy coding symbols may use symbols corresponding to exponential Golomb codes. Video frame data encoded by the entropy coding unit 1003 is packetized and transmitted to a decoder over a network.

Figure 11:
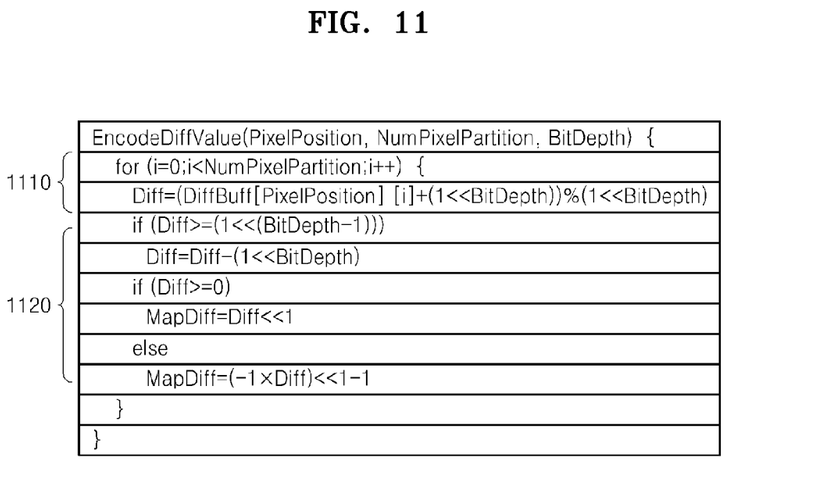
FIG. 11 is a diagram of an example of program source code used to realize a process of encoding a video frame according to an exemplary embodiment.

FIG. 11 is a diagram of an example of program source code used to realize a process of encoding a video frame according to an exemplary embodiment.

Referring to FIG. 11, operation 1110 converts difference values into values that belong to a bit depth range. More specifically, original difference values Diff are summed with level values of a bit depth (1<<Bitdepth), and a modulo operation is performed on resultant values using the level values of the bit depth.

Operation 1120 maps the resultant values to entropy coding symbols MapDiff. More specifically, if a resultant value d is greater than or equal to $2^{p-1}$ (p is the bit depth), the resultant value d is mapped to $2(2^p-d)-1$. If the resultant value d is greater than 0 and smaller than or equal to $2^{p-1}-1$, the resultant value d is mapped to $2d$. Meanwhile, an entropy coding symbol 0 is mapped to 0.

Figure 12:
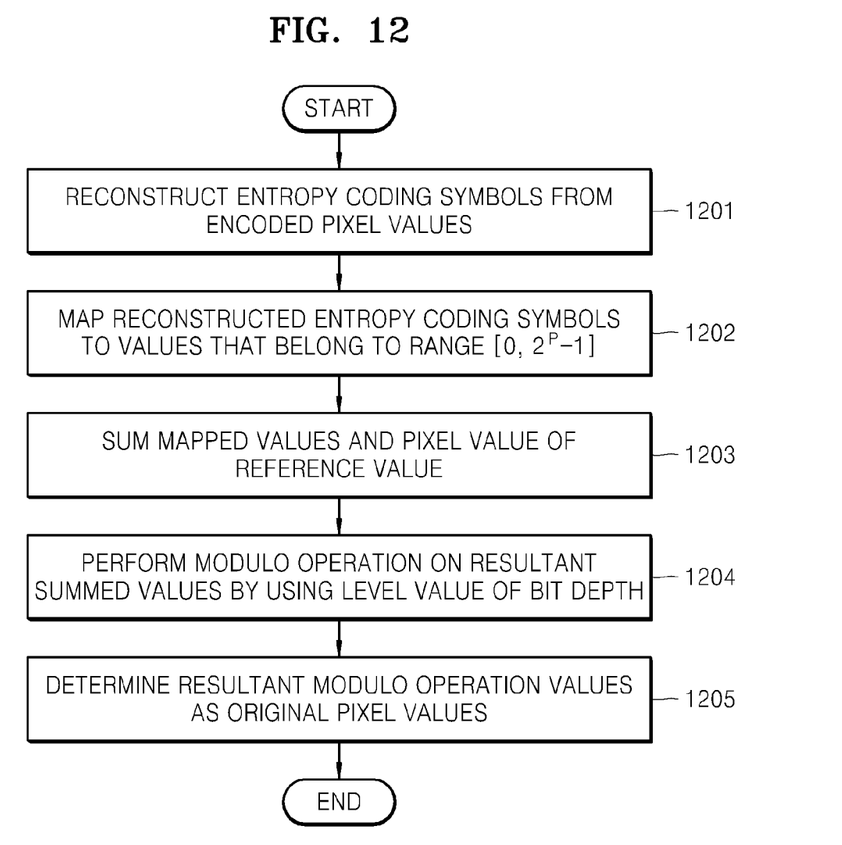
FIG. 12 is a flowchart of a process of decoding an encoded video frame according to an exemplary embodiment.

FIG. 12 is a flowchart of a process of decoding an encoded video frame according to an exemplary embodiment. The decoding process of the present exemplary embodiment is an inverse process of the encoding process described with reference to FIG. 5.

Referring to FIG. 12, in operation 1201, a decoding apparatus reconstructs encoded pixel values, i.e. entropy coding symbols from binary code words. In this regard, the entropy coding symbols may use symbols corresponding to exponential Golomb codes.

In operation 1202, the reconstructed symbols are mapped to values that belong to a bit depth range [0, $2^p-1$], and an inverse process of the mapping process described with reference to FIG. 8C is performed. The mapping process is summarized in the following equation:

$$D_s = \begin{cases} 0 & (s = 0) \\ s/2 & (s : \text{even}) \\ 2^P - (s+1)/2 & (s : \text{odd}) \end{cases}$$

wherein, Ds denotes a value to be mapped to a symbol S, and p denotes a bit depth.

In operation 1203, a pixel value of the reference pixel is summed with the mapped values. As described with reference to FIG. 2, since the reference pixel is transmitted to a transmission end without being encoded, the pixel value of the reference pixel can be easily obtained without separately decoding the reference pixel.

In operation 1204, the modulo operation is performed on the resultant summed values by using the level value of the bit depth.

In operation 1205, the modulo operation resultant values are determined as pixel values to be decoded, i.e. pixel values of pixels neighboring the reference pixel in pixel blocks of the video frame.

Figure 13:
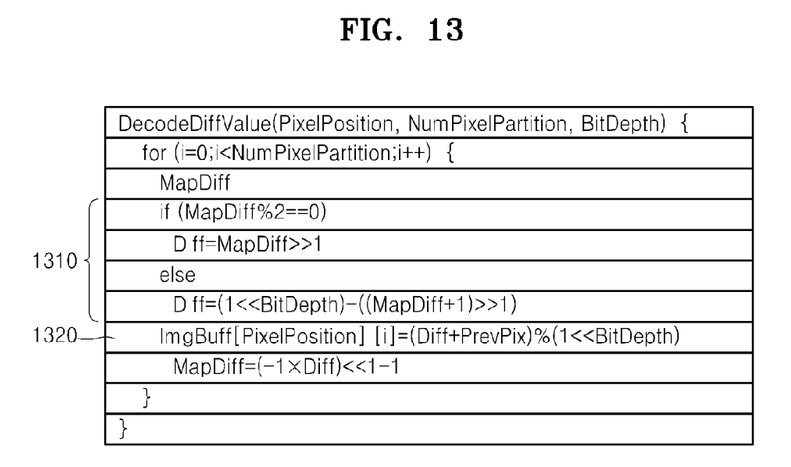
FIG. 13 is a diagram of an example of program source code used to realize a process of decoding an encoded video frame according to an exemplary embodiment.

FIG. 13 is a diagram of an example of program source code used to realize a process of decoding an encoded video frame according to an exemplary embodiment.

Referring to FIG. 13, process 1310 maps entropy coding symbols to values that belong to a bit depth range. In this regard, the entropy coding symbols may use symbols corresponding to exponential Golomb codes. More specifically, if an entropy coding symbol MapDiff is even (i.e., MapDiff % 2==0), a symbol s is mapped to s/2 (MapDiff>>1). If the entropy coding symbol MapDiff is odd, the symbol s is mapped to $2^P-(s+1)/2$. In this regard, p denotes a bit depth. An entropy coding symbol 0 is mapped to 0.

Process 1320 reconstructs pixel values of original pixels by using the mapped values. More specifically, a modulo operation is performed on resultant values obtained by summing a pixel value PrevPix of a reference pixel with the mapped values by using a level value (1<<BitDepth) of the bit depth. The resultant modulo operation values are pixel values before encoding.

Figure 14:
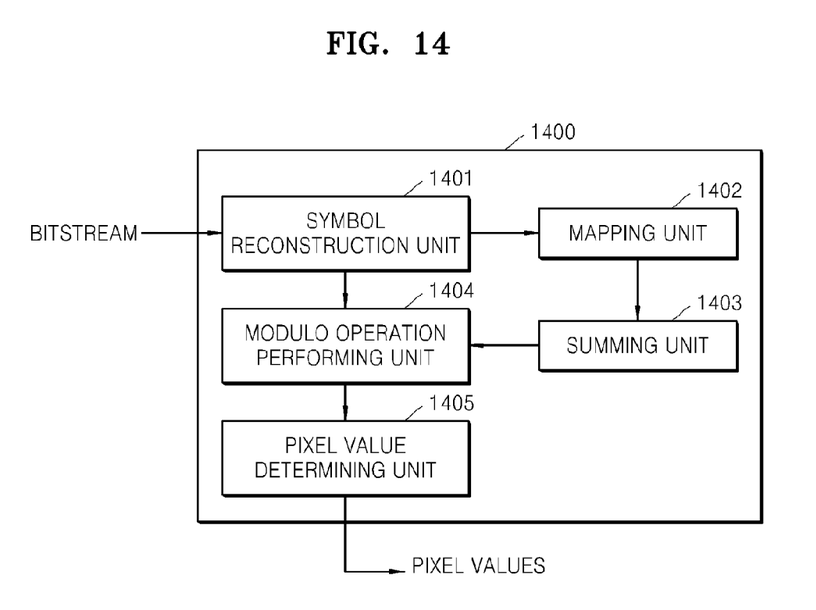
FIG. 14 is a block diagram of an apparatus for decoding an encoded video frame according to an exemplary embodiment.

FIG. 14 is a block diagram of an apparatus 1400 for decoding an encoded video frame according to an exemplary embodiment.

Referring to FIG. 14, the apparatus 1400 for decoding the encoded video frame includes a symbol reconstruction unit 1401, a mapping unit 1402, a summing unit 1403, a modulo operation performing unit 1404, and a pixel value determining unit 1405.

The symbol reconstruction unit 1401 extracts symbols used for entropy coding from encoded pixel values.

The mapping unit 1402 maps the reconstructed symbols to values that belong to a bit depth range.

The summing unit 1403 sums the mapped values with a pixel value of a reference pixel and outputs the summed values to the modulo operation performing unit 1404.

The modulo operation performing unit 1404 performs a modulo operation on the values output by the summing unit 1403 by using a level value of a bit depth.

The pixel value determining unit 1405 determines the values output by the modulo operation performing unit 1404 as original pixel values before being encoded. A display apparatus determines pixel colors by using the reconstructed pixel values and displays the determined pixel colors.

For example, in a video frame having a bit depth 8, the original pixel value is 200, and the pixel value of the reference value is 201. A reference value −1 between the original pixel value 200 and the pixel value of the reference value 201 is converted into 255 by the summing unit 1011 of the apparatus 1000 for decoding the video frame. The resultant converted value 255 is mapped to an entropy coding symbol 1 by performing the modulo operation thereon ($S_d=2(2^P-d)-1$). That is, if entropy coding is performed by using an exponential Golomb code, the original pixel value 200 is encoded as 010 (see FIG. 9).

The symbol reconstruction unit 1401 reconstructs an entropy coding symbol 1 from a bit stream and maps the reconstructed entropy coding symbol 1 to 255 ($D_s=2^P-(s+1)/2$). The summing unit 1403 sums the mapped value 255 with the pixel value 201 of the reference value and outputs the summed value 456. The modulo operation performing unit 1404 performs the modulo operation on the summed value 456 by using the level value 256 of the bit depth, and outputs a resultant modulo operation value 200. The pixel value determining unit 1405 determines the resultant modulo operation value 200 as a pixel value of a pixel to be decoded.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Additionally, the frame dividing unit 1001, the difference value calculation unit 1002, the entropy coding unit 1003, the difference value conversion unit 1010, the summing unit 1011, and the modulo operation performing unit 1012 of FIG. 10 may be implemented by one or more central processing units (CPUs) either alone or in combination with one or more external memories. Similarly, the symbol reconstruction unit 1401, the modulo operation performing unit 1404, the pixel value determining unit 1405, the mapping unit 1402, and the summing unit 1403 of FIG. 14 may be implemented by one or more central processing units (CPUs) either alone or in combination with one or more external memories.

While this inventive concept has been particularly shown and described with reference to exemplary embodiments thereof, it will be understood by those of ordinary skill in the art that various changes in form and details may be made therein without departing from the spirit and scope as defined by the appended claims. The exemplary embodiments should be considered in a descriptive sense only and not for purposes of limitation. Therefore, the scope of the inventive concept is defined not by the detailed description but by the appended claims, and all differences within the scope will be construed as being included in the present inventive concept.

What is claimed is:

1. A method of encoding a video frame, the method comprising:
   dividing the video frame into a plurality of pixel blocks each including at least one reference pixel where the at least one reference pixel is predetermined;
   calculating difference values between the at least one reference pixel in a current pixel block and pixels neighboring the at least one reference pixel where the pixels neighboring the at least one reference pixel are located in the current pixel block;
   converting the calculated difference values into values that belong to a bit depth range; and
   performing entropy coding by using the converted difference values as symbols,
   wherein the performing of entropy coding comprises:

rearranging the converted difference values in an order of occurrence probabilities of the difference values before being converted; and mapping the rearranged difference values to symbols used for entropy coding.

2. The method of claim 1, wherein the difference values between the reference pixel and the pixels neighboring the reference pixel are calculated for each one of the pixel blocks, and the calculated difference values are converted with respect to the pixel blocks into values that belong to a bit depth range.

3. The method of claim 1, wherein the converting of the calculated difference values comprises:

summing the difference values and a level value of a bit depth; and performing a modulo operation on the summed values by using the level value of the bit depth.

4. The method of claim 1, wherein in the performing entropy coding, an exponential Golomb code is used.

5. The method of claim 4, wherein the mapping of the converted difference values is performed according to $$S_d = \begin{cases} 0 & (d = 0) \\ 2d & (1 \leq d \leq 2^{P-1} - 1) \\ 2(2^P - d) - 1 & (2^{P-1} \leq d \leq 2^P - 1) \end{cases}$$

wherein d denotes the converted difference values, Sd denotes the symbols mapped to d, and p denotes the bit depth.

6. The method of claim 4, wherein the mapping of the converted difference values comprises:

mapping a first converted difference value to the symbols wherein the first converted difference value is less than a threshold value;

mapping a second converted difference value, based on the first converted difference value and a bit depth, to the symbols wherein the first converted difference value is greater than the threshold value.

7. The method of claim 6, wherein the mapping of the converted difference values comprises:

when the first converted difference value is less than the threshold value, the symbols are calculated according to $$S_d = \begin{cases} 2d_1 (d_1 \geq 0) \\ -2d_1 - 1 (d_1 < 0) \end{cases}$$

when the first converted difference value is greater than the threshold value, the symbols are calculated according to $$S_d = \begin{cases} 2d_1 (d_1 \geq 0) \\ -2d_1 - 1 (d_1 < 0) \end{cases}$$

$$d_2 = d_1 - 2p$$

wherein $d_1$ denotes the first converted difference values, $d_2$ denotes the second converted difference values, Sd denotes the symbols mapped to d1 and d2, and p denotes the bit depth.

8. A non-transitory computer-readable recording medium storing a computer-readable program for executing a method comprising:

dividing the video frame into a plurality of pixel blocks each including at least one reference pixel where the at least one reference pixel is predetermined;

calculating difference values between the at least one reference pixel in a current pixel block and pixels neighboring the at least one reference pixel where the pixels neighboring the at least one reference pixel are located in the current pixel block;

converting the calculated difference values into values that belong to a bit depth range; and performing entropy coding by using the converted difference values as symbols, wherein the performing of entropy coding comprises:

rearranging the converted difference values in an order of occurrence probabilities of the difference values before being converted; and mapping the rearranged difference values to symbols used for entropy coding.

9. An apparatus for encoding a video frame, the apparatus comprising:

a frame dividing unit that divides the video frame into a plurality of pixel blocks each including at least one reference pixel where the at least one reference pixel is predetermined;

a difference value calculating unit that calculates difference values between the at least one reference pixel in a current pixel block and pixels neighboring the at least one reference pixel where the pixels neighboring the at least one reference pixel are located in the current pixel block;

a difference value converting unit that converts the calculated difference values into values that belong to a bit depth range; and an entropy coding unit that performs entropy coding by using the converted difference values as symbols, wherein the entropy coding unit rearranges the converted difference values in an order of occurrence probabilities of the difference values before being converted, and maps the rearranged difference values to symbols used for entropy coding.

10. The apparatus of claim 9, wherein the difference value calculating unit calculates, for each one of the pixel blocks, the difference values between the reference pixel and the pixels neighboring the reference pixel, and the difference value converting unit converts the calculated difference values with respect to the pixel blocks into values that belong to a bit depth range.

11. The apparatus of claim 9, wherein the difference value converting unit comprises:

a summing unit that sums the difference values with a level value of a bit depth; and a modulo operation performing unit that performs a modulo operation on the summed values by using the level value of the bit depth.

12. The apparatus of claim 9, wherein the entropy coding unit maps the converted difference values to symbols used for entropy coding using an exponential Golomb code.

13. The apparatus of claim 12, wherein the entropy coding unit maps the converted difference values according to $$S_d = \begin{cases} 0 & (d = 0) \\ 2d & (1 \leq d \leq 2^{P-1} - 1) \\ 2(2^P - d) - 1 & (2^{P-1} \leq d \leq 2^P - 1) \end{cases}$$

wherein d denotes the converted difference value, Sd denotes the symbols mapped to d, and p denotes the bit depth.

14. The apparatus of claim 12, wherein the mapping of the converted difference values comprises:
mapping a first converted difference value to the symbols wherein the first converted difference value is less than a threshold value;
mapping a second converted difference value, based on the first converted difference value and a bit depth, to the symbols wherein the first converted difference value is greater than the threshold value.

15. The apparatus of claim 14, wherein the mapping of the converted difference values comprises:
when the first converted difference value is less than the threshold value, the symbols are calculated according to $$S_d = \begin{cases} 2d_1 (d_1 \geq 0) \\ -2d_1 - 1 (d_1 < 0) \end{cases}$$

when the first converted difference value is greater than the threshold value, the symbols are calculated according to $$S_d = \begin{cases} 2d_2 (d_2 \geq 0) \\ -2d_2 - 1 (d_2 < 0) \end{cases}$$
$$d_2 = d_1 - 2p$$

wherein $d_1$ denotes the first converted difference values, $d_2$ denotes the second converted difference values, Sd denotes the symbols mapped to d1 and d2, and p denotes the bit depth.

16. A method of decoding an encoded video frame, the method comprising:
reconstructing symbols used for entropy coding from encoded pixel values;
mapping the reconstructed symbols to values that belong to a bit depth range;
summing the mapped values and a pixel value of at least one reference pixel where the at least one reference pixel is predetermined;
performing a modulo operation on the summed values by using a level value of a bit depth; and
determining resultant modulo operation values as pixel values of pixels neighboring the at least one reference pixel included in the encoded video frame,
wherein the encoded pixel values are based on difference values between the at least one reference pixel in a current pixel block and pixels neighboring the at least one reference pixel where the pixels neighboring the at least one reference pixel are located in the current pixel block.

17. The method of claim 16, wherein the mapping of the reconstructed symbols is performed according to $$D_s = \begin{cases} 0 & (s = 0) \\ s/2 & (s : \text{even}) \\ 2^P - (s+1)/2 & (s : \text{odd}) \end{cases}$$

wherein Ds denotes the mapped values for the symbols s, and p denotes the bit depth.

18. The method of claim 16, wherein the symbols are entropy coding symbols corresponding to an exponential Golomb code.

19. The method of claim 16, wherein the mapping of the reconstructed symbols is performed according to $$D_s = \begin{cases} s/2 (s : \text{even}) \\ 2p - s/2 (s : \text{odd}) \end{cases}$$

wherein Ds denotes the mapped values for the symbols s, and p denotes the bit depth.

20. A non-transitory computer-readable recording medium storing a computer-readable program for executing a method comprising:
reconstructing symbols used for entropy coding from encoded pixel values;
mapping the reconstructed symbols to values that belong to a bit depth range;
summing the mapped values and a pixel value of at least one reference pixel where the at least one reference pixel is predetermined;
performing a modulo operation on the summed values by using a level value of a bit depth; and
determining resultant modulo operation values as pixel values of pixels neighboring the at least one reference pixel included in the encoded video frame,
wherein the encoded pixel values are based on difference values between the at least one reference pixel in a current pixel block and pixels neighboring the at least one reference pixel where the pixels neighboring the at least one reference pixel are located in the current pixel block.

21. An apparatus for decoding an encoded video frame, the apparatus comprising:
a symbol reconstruction unit that reconstructs symbols used for entropy coding from encoded pixel values;
a mapping unit that maps the reconstructed symbols to values that belong to a bit depth range;
a summing unit that sums the mapped values with a pixel value of at least one reference pixel where the at least one reference pixel is predetermined;
a modulo operation performing unit that performs a modulo operation on the summed values by using a level value of a bit depth; and
a pixel value determining unit that determines resultant modulo operation values as pixel values of pixels neighboring the at least one reference pixel included in the encoded video frame,
wherein the encoded pixel values are based on difference values between the at least one reference pixel in a current pixel block and pixels neighboring the at least one reference pixel where the pixels neighboring the at least one reference pixel are located in the current pixel block.

22. The apparatus of claim 21, wherein the mapping unit maps the reconstructed symbols according to $$D_s = \begin{cases} 0 & (s = 0) \\ s/2 & (s : \text{even}) \\ 2^P - (s+1)/2 & (s : \text{odd}) \end{cases}$$

wherein Ds denotes the mapped values for the symbols s, and p denotes the bit depth.

23. The apparatus of claim 21, wherein the symbols are entropy coding symbols corresponding to an exponential Golomb code.

24. The apparatus of claim 21, wherein the mapping unit maps the reconstructed symbols according to $$D_s = \begin{cases} s/2 & (s: \text{even}) \\ 2p - s/2 & (s: \text{odd}) \end{cases}$$

wherein Ds denotes the mapped values for the symbols s, and p denotes the bit depth.

* * * * *